(12) United States Patent
Tirey, Jr.

(10) Patent No.: US 6,336,452 B1
(45) Date of Patent: Jan. 8, 2002

(54) SOLAR POWERED FLUID HEATING SYSTEM

(76) Inventor: Tommy Lee Tirey, Jr., 13470 Hogg Ranch Rd., Yankee Hill, CA (US) 95965

( * ) Notice: Subject to any disclaimer, the term of this patent is extended or adjusted under 35 U.S.C. 154(b) by 0 days.

(21) Appl. No.: 09/506,561

(22) Filed: Feb. 18, 2000

(51) Int. Cl.[7] .................................. F24J 2/12; F24J 2/24
(52) U.S. Cl. ...................... 126/690; 126/605; 126/685; 126/634; 126/651; 126/578
(58) Field of Search .................. 126/690, 600, 126/601, 605, 688, 684, 573, 574, 576, 578, 634, 651, 572, 685, 686, 656, 657

(56) References Cited

U.S. PATENT DOCUMENTS

| | | |
|---|---|---|
| 1,753,227 A | 4/1930 | Wheeler et al. |
| 2,213,894 A | 9/1940 | Barry |
| 3,200,820 A * | 8/1965 | Garrett ........................ 126/690 |
| 4,021,895 A | 5/1977 | Morse et al. |
| 4,038,971 A | 8/1977 | Bezborodko |
| 4,171,876 A * | 10/1979 | Wood ......................... 126/690 |
| 4,332,238 A * | 6/1982 | Garcia, Jr. ................... 126/578 |
| 4,408,595 A * | 10/1983 | Broyles et al. .............. 126/688 |
| D275,876 S | 10/1984 | Everett |
| 4,599,995 A * | 7/1986 | Dane .......................... 126/690 |
| 4,602,617 A | 7/1986 | Clegg |
| 4,656,996 A * | 4/1987 | Aharon ....................... 126/690 |
| 5,275,149 A * | 1/1994 | Ludlow ...................... 126/605 |
| 5,979,438 A * | 11/1999 | Nakamura ................... 126/685 |

FOREIGN PATENT DOCUMENTS

GB     2 002 507 A * 2/1979 .................. 126/690

* cited by examiner

*Primary Examiner*—Ira S. Lazarus
*Assistant Examiner*—Josiah C. Cocks

(57) ABSTRACT

A solar powered fluid heating system for providing a user with a cost and energy saving advantage when heating fluids includes a solar dish which includes a mirrored concave surface. A power head assembly coupled to the solar dish by a support pole extending outwardly from the solar dish. A fluid line extending through the support pole. The fluid line is coiled at a focal point of the mirrored surface of the solar dish whereby solar rays are directed by the solar dish onto the coiled fluid line for heating fluid passing through the coiled fluid line.

9 Claims, 10 Drawing Sheets

SOLAR POWERED FLUID HEATING SYSTEM

BACKGROUND OF THE INVENTION

1. Field of the Invention

The present invention relates to fluid heating systems and more particularly pertains to a new solar powered fluid heating system for providing a user with a cost and energy saving advantage when heating fluids.

2. Description of the Prior Art

The use of fluid heating systems is known in the prior art. More specifically, fluid heating systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,038,971; 4,602, 617; U.S. Pat. No. DES. 275,876; U.S. Pat. Nos. 2,213,894; 4,021,895; and 1,753,227.

While these devices fulfill their respective, particular objectives and requirements, the aforementioned patents do not disclose a new solar powered fluid heating system. The inventive device includes a solar dish having a mirrored concave surface. A power head assembly coupled to the solar dish by a support pole extending outwardly from the solar dish. A fluid line extending through the support pole. The fluid line is coiled at a focal point of the mirrored surface of the solar dish whereby solar rays are directed by the solar dish onto the coiled fluid line for heating fluid passing through the coiled fluid line.

In these respects, the solar powered fluid heating system according to the present invention substantially departs from the conventional concepts and designs of the prior art, and in so doing provides an apparatus primarily developed for the purpose of providing a user with a cost and energy saving advantage when heating fluids.

SUMMARY OF THE INVENTION

In view of the foregoing disadvantages inherent in the known types of fluid heating systems now present in the prior art, the present invention provides a new solar powered fluid heating system construction wherein the same can be utilized for providing a user with a cost and energy saving advantage when heating fluids.

The general purpose of the present invention, which will be described subsequently in greater detail, is to provide a new solar powered fluid heating system apparatus and method which has many of the advantages of the fluid heating systems mentioned heretofore and many novel features that result in a new solar powered fluid heating system which is not anticipated, rendered obvious, suggested, or even implied by any of the prior art fluid heating systems, either alone or in any combination thereof.

To attain this, the present invention generally comprises a solar powered fluid heating system includes a solar dish which includes a mirrored concave surface. A power head assembly coupled to the solar dish by a support pole extending outwardly from the solar dish. A fluid line extending through the support pole. The fluid line is coiled at a focal point of the mirrored surface of the solar dish whereby solar rays are directed by the solar dish onto the coiled fluid line for heating fluid passing through the coiled fluid line.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new solar powered fluid heating system apparatus and method which has many of the advantages of the fluid heating systems mentioned heretofore and many novel features that result in a new solar powered fluid heating system which is not anticipated, rendered obvious, suggested, or even implied by any of the prior art fluid heating systems, either alone or in any combination thereof.

It is another object of the present invention to provide a new solar powered fluid heating system that may be easily and efficiently manufactured and marketed.

It is a further object of the present invention to provide a new solar powered fluid heating system that is of a durable and reliable construction.

An even further object of the present invention is to provide a new solar powered fluid heating system which is susceptible of a low cost of manufacture with regard to both materials and labor, and which accordingly is then susceptible of low prices of sale to the consuming public, thereby making such solar powered fluid heating system economically available to the buying public.

Still yet another object of the present invention is to provide a new solar powered fluid heating system which provides in the apparatuses and methods of the prior art some of the advantages thereof, while simultaneously overcoming some of the disadvantages normally associated therewith.

Still another object of the present invention is to provide a new solar powered fluid heating system for providing a user with a cost and energy saving advantage when heating fluids.

Yet another object of the present invention is to provide a new solar powered fluid heating system which includes a solar powered fluid heating system includes a solar dish which includes a mirrored concave surface. A power head assembly coupled to the solar dish by a support pole extending outwardly from the solar dish. A fluid line extending through the support pole. The fluid line is coiled at a focal point of the mirrored surface of the solar dish whereby solar rays are directed by the solar dish onto the coiled fluid line for heating fluid passing through the coiled fluid line.

Still yet another object of the present invention is to provide a new solar powered fluid heating system that eliminates the dependency for petrochemical fuels.

Even still another object of the present invention is to provide a new solar powered fluid heating system that will provide a user with an environmental friendly method of heating fluids while saving the user money in energy bills.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
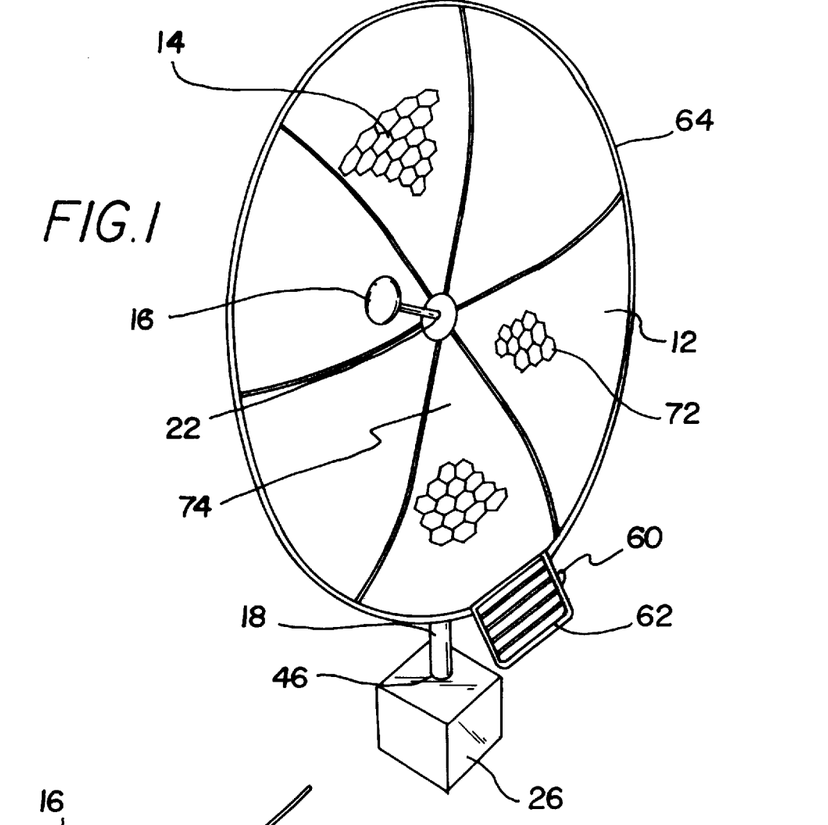
FIG. 1 is a perspective view of a new solar powered fluid heating system according to the present invention.
Figure 2:
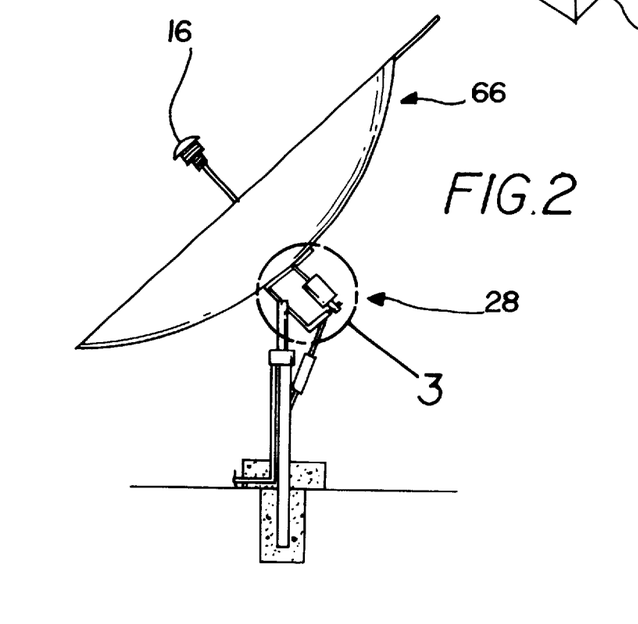
FIG. 2 is a side view of the present invention.
Figure 3:
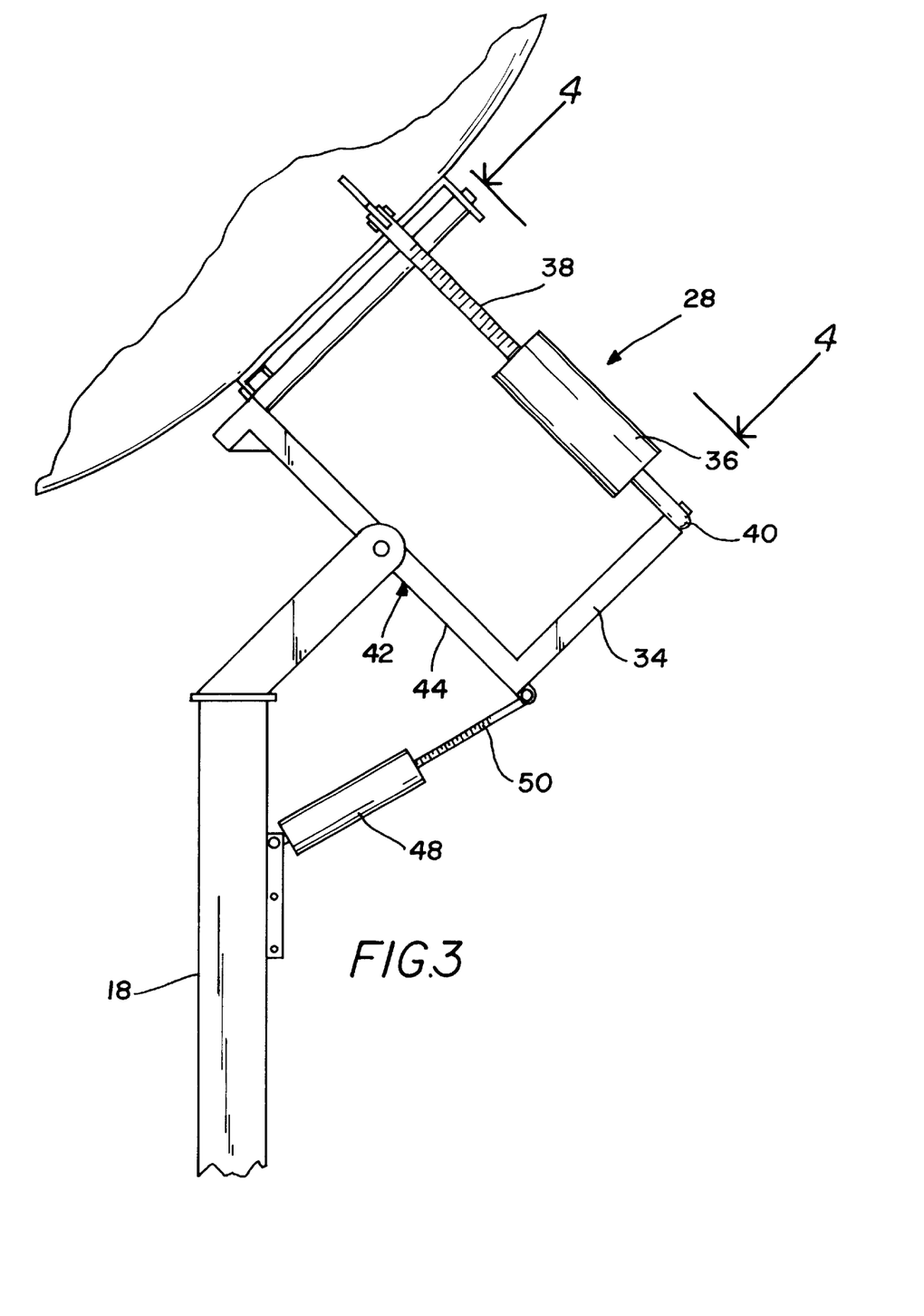
FIG. 3 is an exploded side view of the present invention.
Figure 4:
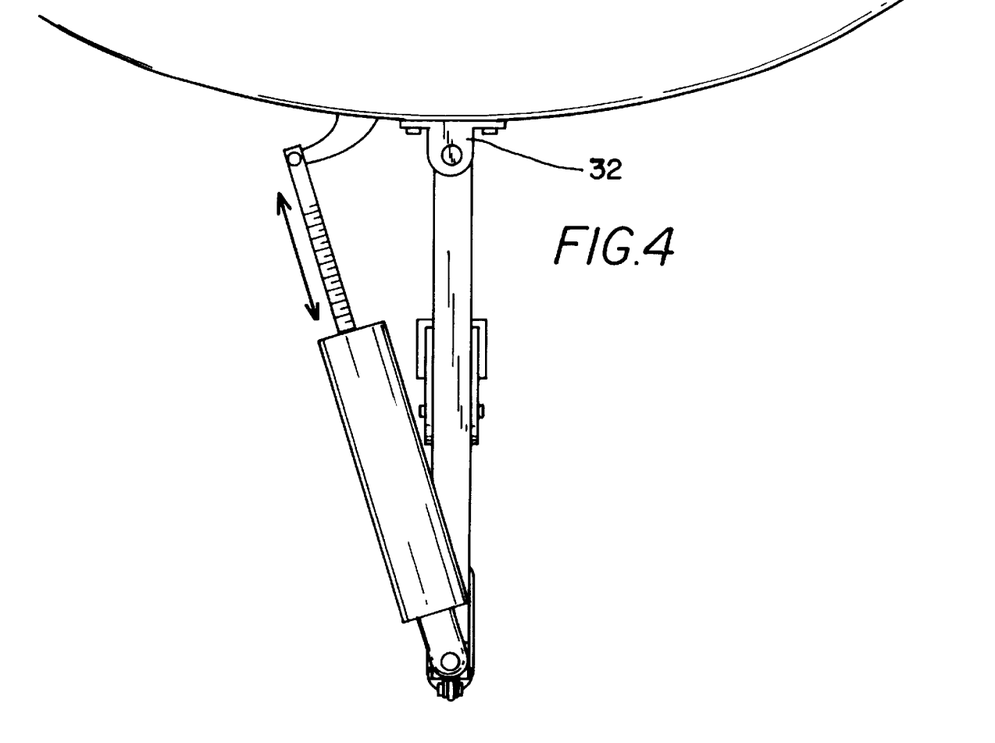
FIG. 4 is an exploded top view of the present invention.
Figure 5:
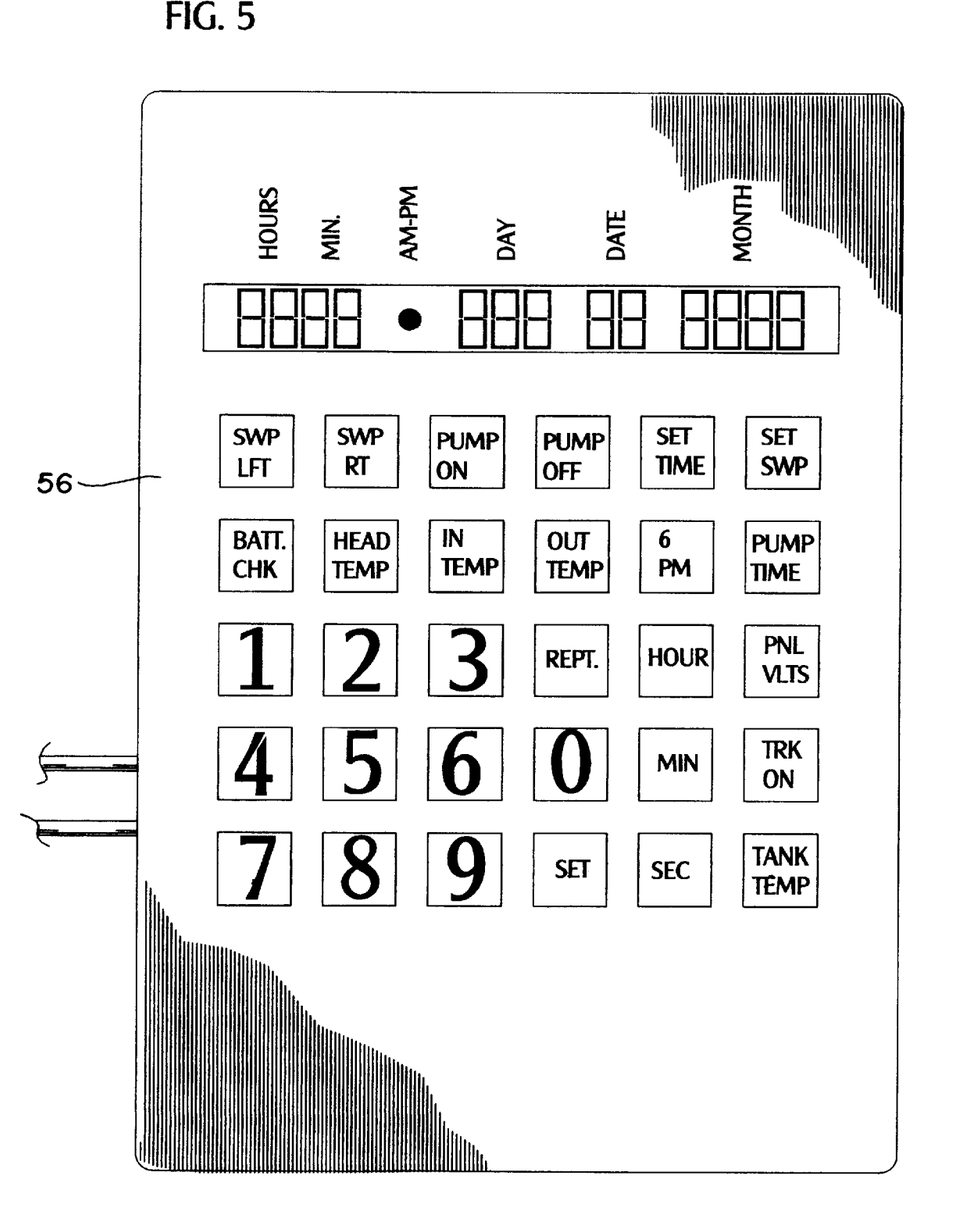
FIG. 5 is a top view of the remote unit of the present invention.
Figure 6:
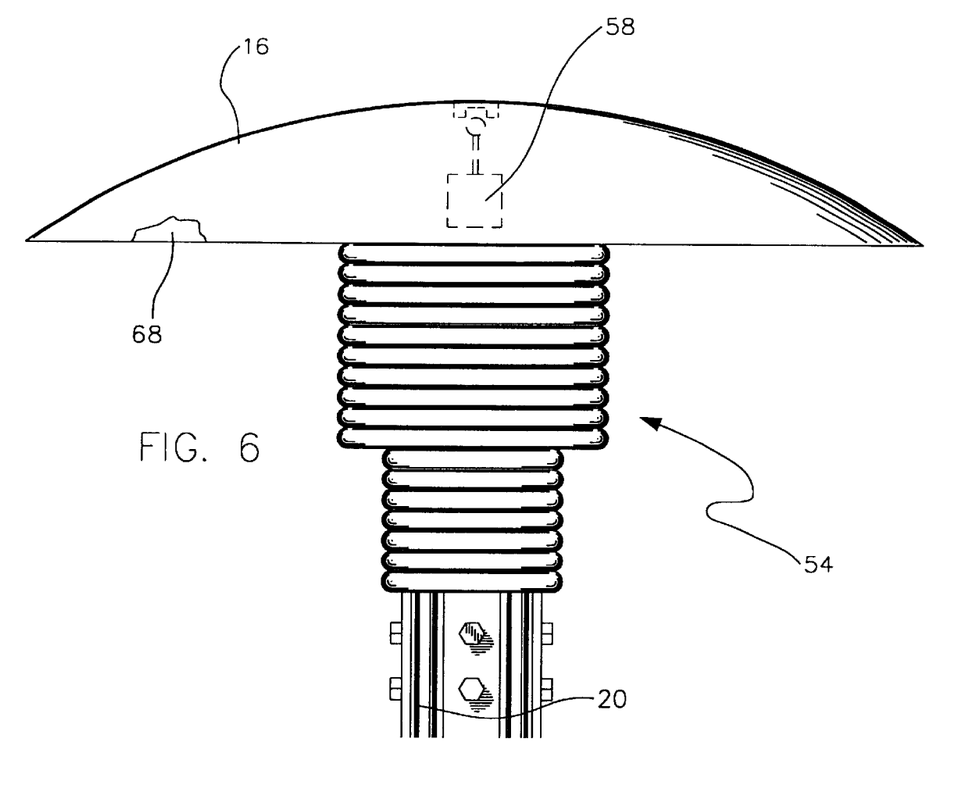
FIG. 6 is a side view of the power head of the present invention.
Figure 7:
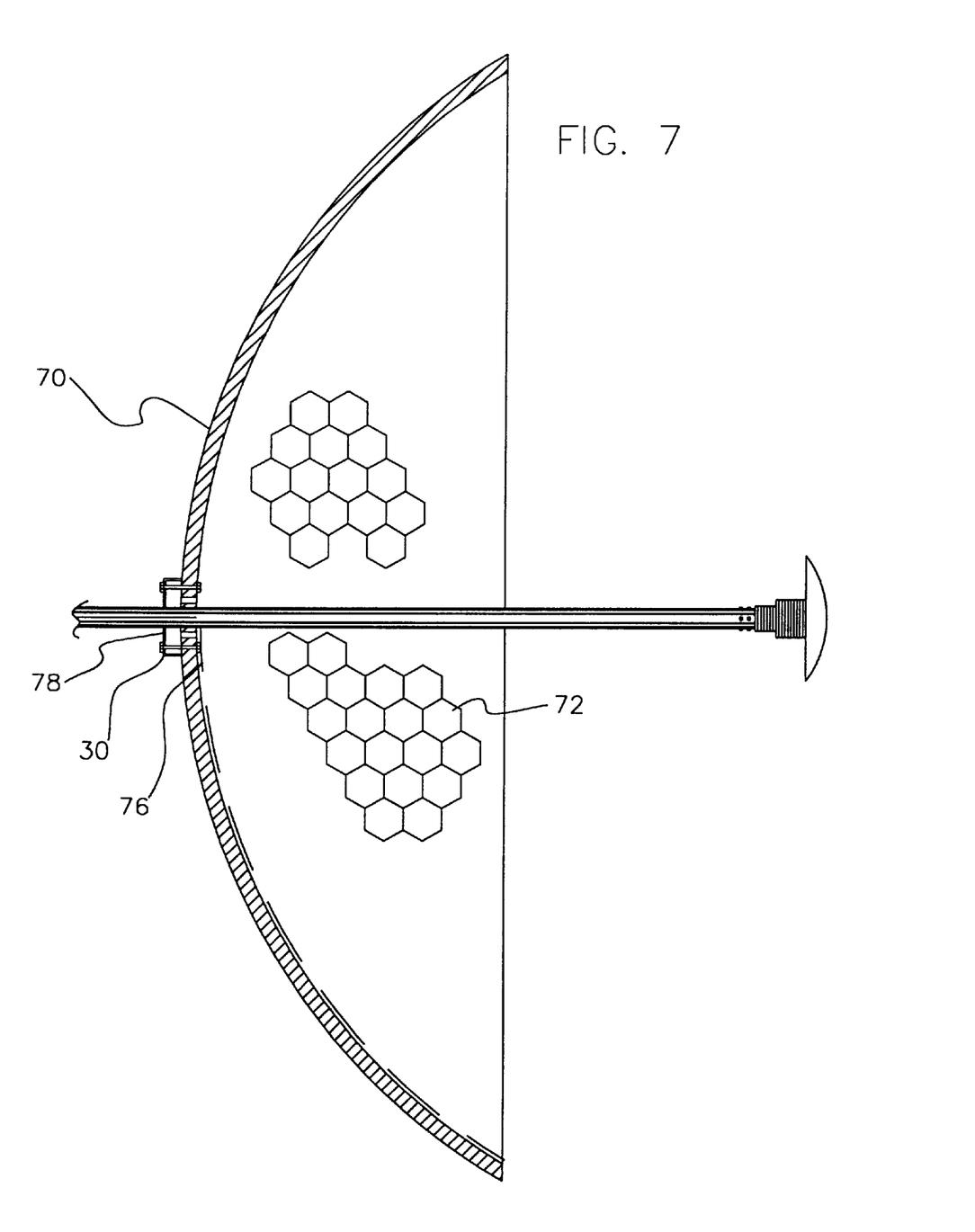
FIG. 7 is a side view of the dish assembly of the present invention.
Figure 8:
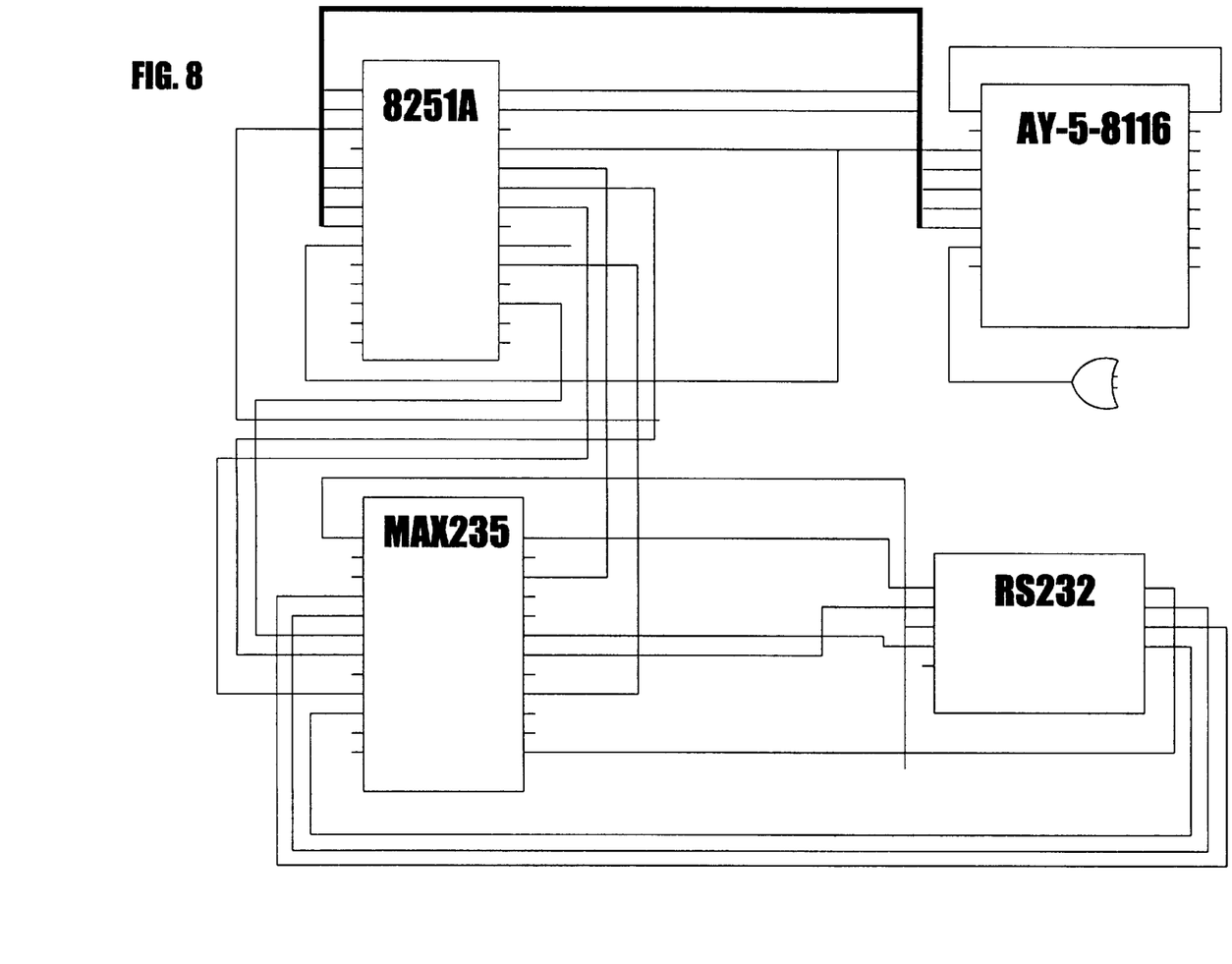
FIG. 8 is a partial electrical schematic of the controller of the present invention.
Figure 9:
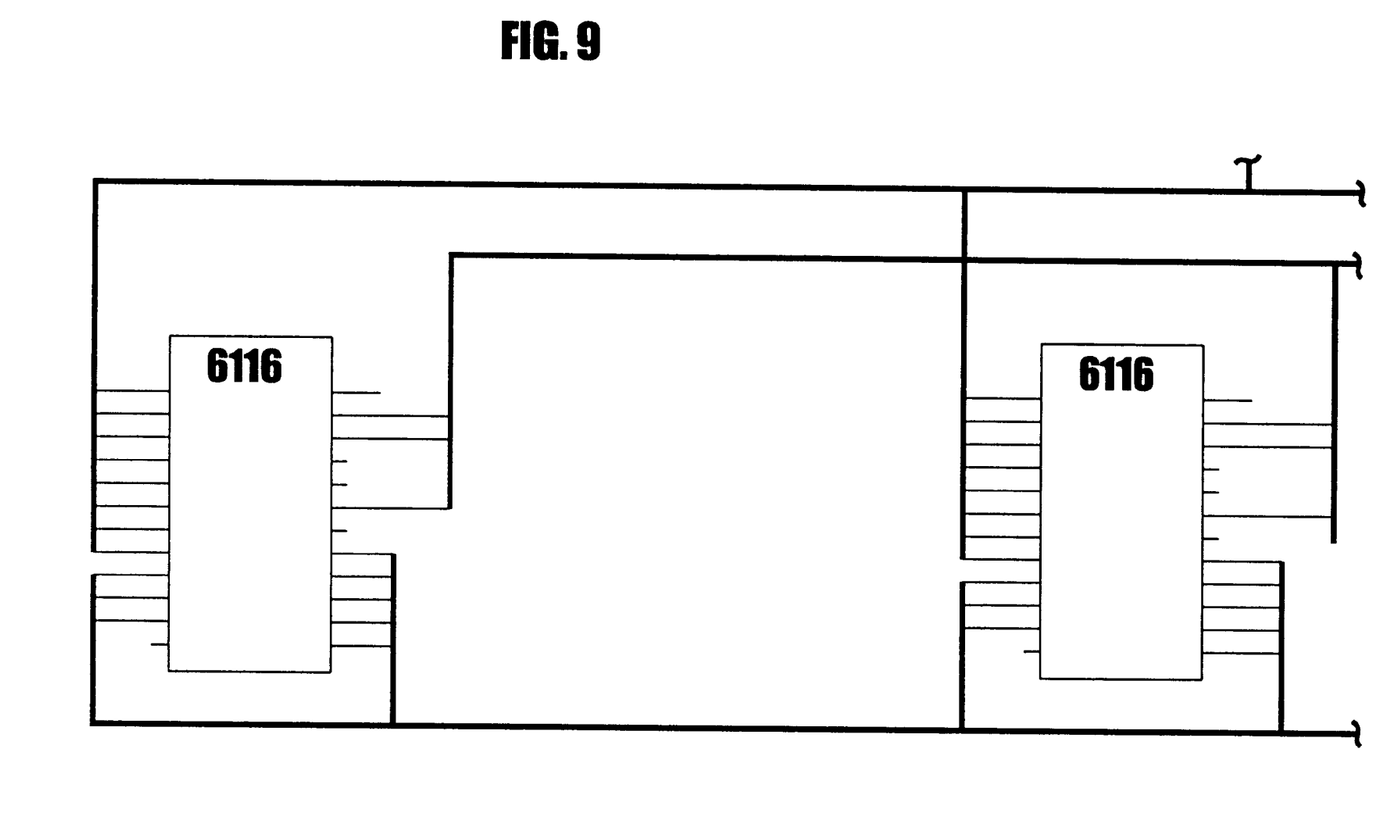
FIG. 9 is a partial electrical schematic of the controller of the present invention.
Figure 10:
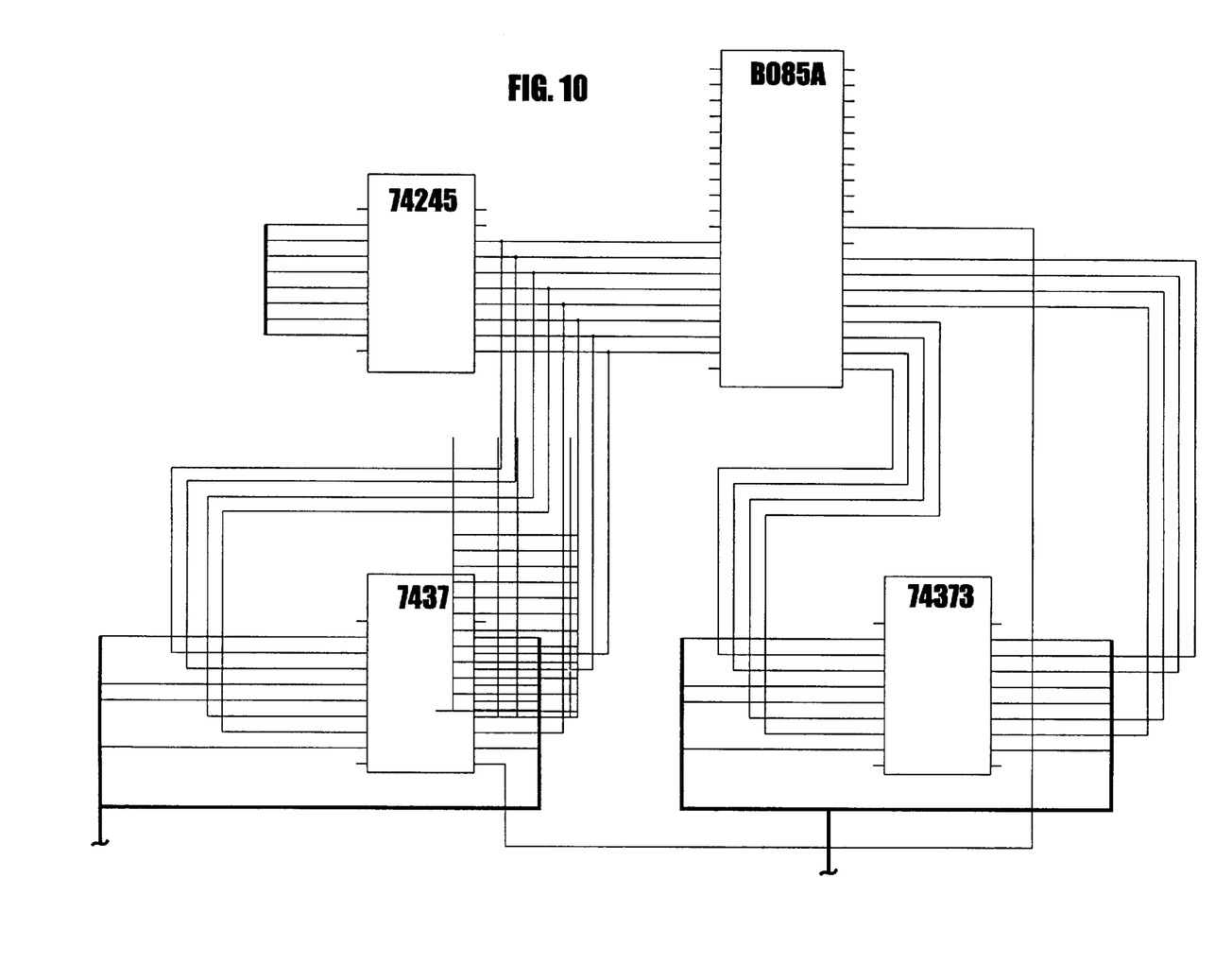
FIG. 10 is a partial electrical schematic of the controller of the present invention.
Figure 11:
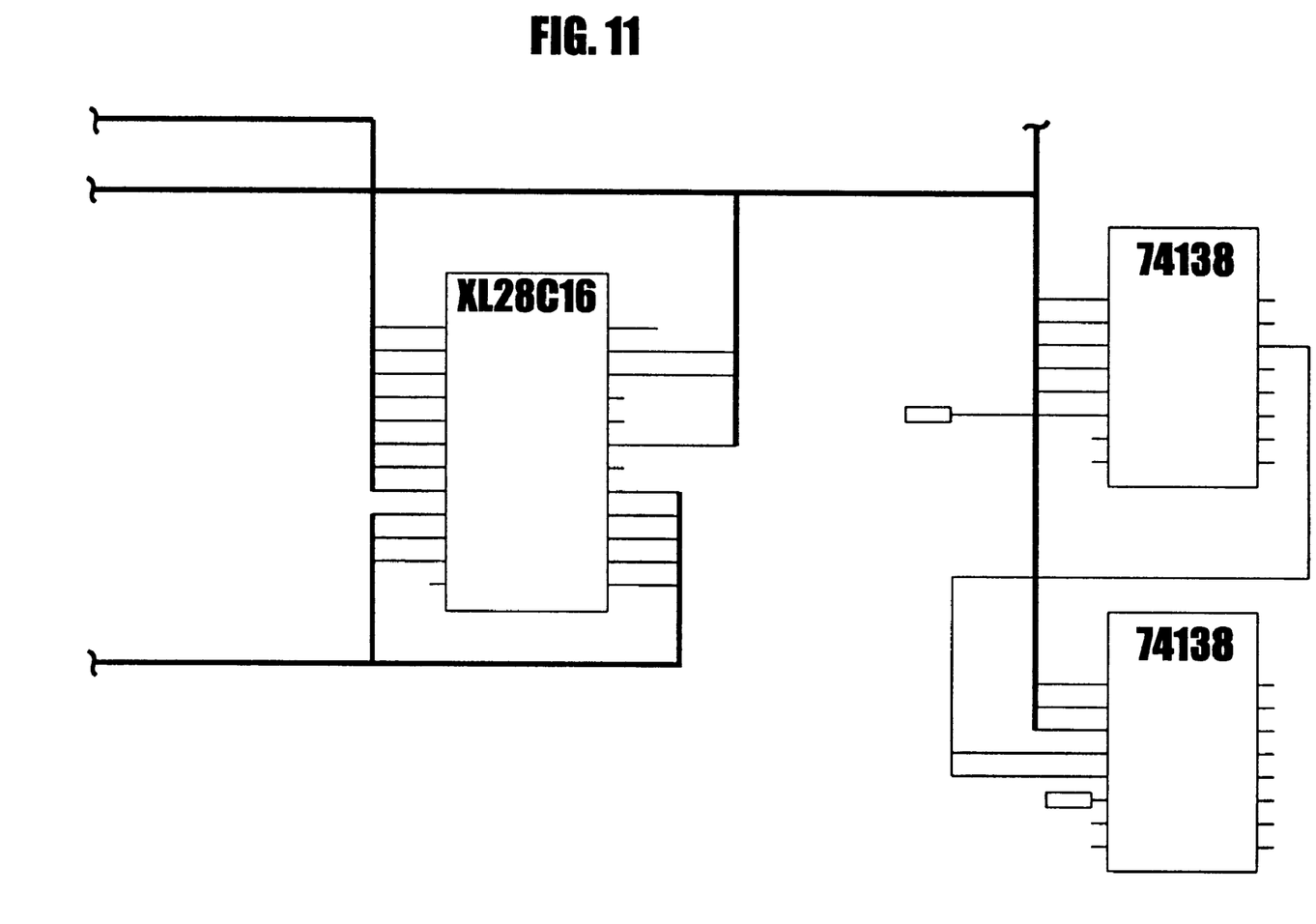
FIG. 11 is a partial electrical schematic of the controller of the present invention.

With reference now to the drawings, and in particular to FIGS. 1 through 11 thereof, a new solar powered fluid heating system embodying the principles and concepts of the present invention and generally designated by the reference numeral 10 will be described.

As best illustrated in FIGS. 1 through 11, the solar powered fluid heating system 10 generally comprises a solar dish 12, which includes a mirrored concave surface 14. A power head assembly 16 coupled to the solar dish 12 by a support pole 18 extending outwardly from the solar dish 12.

A fluid line 20 extends through the support pole 18. The fluid line 20 is coiled at a focal point 22 of the mirrored surface 14 of the solar dish 12 whereby solar rays are directed by the solar dish 12 onto the coiled fluid line 20 for heating fluid passing through the coiled fluid line 20. The system 10 also includes a base support member 26 for supporting the solar dish 12. A dish adjustment assembly 28 is coupled between the solar dish 12 and the base support member 26 for adjustably coupling the solar dish 12 to the base support member 26 whereby the solar dish 12 is designed for positioning to face the sun.

The dish adjustment assembly 28 includes a mounting bracket 30 mounted to the solar dish 12. A connection member 32 is mounted to the solar dish 12 and is positioned offset from the mounting bracket 30. A generally U-shaped adjustment bracket 34 is pivotally mounted to the mounting bracket 30. A first adjustment motor 36 includes an extendable adjustment arm 38 and is coupled between the connection member 32 and a distal end 40 of the adjustment bracket 34 such that extension of the adjustment arm 38 pivots the solar dish relative to the adjustment bracket 34. A medial portion 42 of a cross-member 44 of the adjustment bracket 34 is pivotally coupled to a base connection member 46 extending from the base support member 26. A second adjustment motor 48 includes an extendable adjustment arm 50 and is coupled between the base support member 26 and an end of the cross-member 44 of the adjustment bracket 34 such that extension of the adjustment arm 38 of the second adjustment motor 48 pivots the solar dish 12 relative to the base connection member 46.

The power head assembly 16 is positioned proximate a focal point 22 of the mirrored concave surface 14 for maximizing efficiency of the fluid heating system. The electronic control assembly 56 electrically is coupled to the first adjustment motor 36 and the second adjustment motor 48 for facilitating positioning of the solar dish 12. The power head assembly 16 includes a heat sensor 58. The heat sensor 58 is electrically coupled to the electronic control assembly 56. A light sensor 60 is mechanically coupled to the solar dish 12 and is electrically coupled to the electronic control assembly 56 for facilitating automatic positioning of the solar dish 12 by the electronic control assembly 56 selectively activating the first 36 and second 48 adjustment motors. Thus, the solar dish 12 is designed to face the sun as the sun moves relative to the position of the solar dish 12 to maximize the efficiency of the fluid heating system 54.

A solar collector panel 62 is coupled to a perimeter edge 64 of the solar dish 12. The solar collector panel 62 is electrically coupled to the electronic control assembly 56 for providing power to the electronic control assembly 56. The power head assembly 16 includes a dish member 66, the dish member 66 includes a reflective concave surface 68 facing the mirrored concave surface 14 of the solar dish 12 for directing solar rays to the coiled fluid line 20 for heating fluid passing through the coiled fluid line 20.

In an embodiment, the solar dish 12 includes a plurality of generally triangular fiberglass panels 70, each panel 70 includes a plurality of generally hexagonal mirrors 72 coupled to a face 74 of the panel for providing the mirrored surface 14. The solar 12 dish includes a generally hexagonal central plate member 76, the central plate member 76 including at least one drainage hole 78 for permitting fluid to drain from the solar dish 12. The central plate 76 further includes a plurality of bolt holes 11 for facilitating coupling of the panels 70 to the central plate 76 for forming the solar dish 12. The dish member 66 of the power head assembly 16 includes a generally hexagonal outer perimeter edge 64.

In use, the solar fluid heater can be used in a host of applications including heating of outdoor pools and hot tubs, heating of potable water and heating of homes and businesses.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A solar powered fluid heating system comprising:
   a solar dish having a mirrored concave surface;
   a power head assembly coupled to said solar dish by a support pole extending outwardly from said solar dish;
   a fluid line extending through a lumen of said support pole, an outer wall of said support pole inhibiting damage to said fluid line extending through said support pole, said fluid line being coiled at a focal point of said mirrored surface of said solar dish whereby solar rays are directed by said solar dish onto said coiled fluid line for heating fluid passing through said coiled fluid line;
   said power head assembly being positioned proximate a focal point of said mirrored concave surface for maximizing efficiency of said fluid heating system;
   said power head assembly including a dish member, said dish member having a reflective concave surface facing said mirrored concave surface of said solar dish for directing solar rays to said coiled fluid line for heating fluid passing through said coiled fluid line.

2. The solar powered fluid heating system of claim 1, further comprising:
   a base support member for supporting said solar dish;
   a dish adjustment assembly coupled between said solar dish and said base support member for adjustably coupling said solar dish to said base support member whereby said solar dish is adapted for positioning to face the sun.

3. The solar powered fluid heating system of claim 2, wherein said dish adjustment assembly comprises:
   a mounting bracket mounted to said solar dish;
   a connection member mounted to said solar dish and offset from said mounting bracket;
   a generally U-shaped adjustment bracket pivotally mounted to said mounting bracket;
   a first adjustment motor having an extendable adjustment arm, said first adjustment motor being coupled between said connection member and a distal end of said adjustment bracket such that extension of said adjustment arm pivots said solar dish relative to said adjustment bracket;
   a medial portion of a cross-member of said adjustment bracket being pivotally coupled to a base connection member extending from said base support member; and
   a second adjustment motor having an extendable adjustment arm, said second adjustment motor being coupled between said base support member and an end of said cross-member of said adjustment bracket such that extension of said adjustment arm of said second adjustment motor pivots said solar dish relative to said base connection member.

4. The solar powered fluid heating system of claim 3, further comprising:
   an electronic control assembly operationally coupled to said first adjustment motor and said second adjustment motor for facilitating positioning of said solar dish.

5. The solar powered fluid heating system of claim 4, further comprising:
   said power head assembly including a heat sensor, said heat sensor being operationally coupled to said electronic control assembly;
   a light sensor coupled to said solar dish and operationally coupled to said electronic control assembly for facilitating automatic positioning of said solar dish such that said electronic control assembly selectively activates said first and second adjustment motors whereby the solar dish is adapted to face the sun as the sun moves relative to the position of the solar dish to maximize the efficiency of the fluid heating system.

6. The solar powered fluid heating system of claim 4, further comprising:
   a solar collector panel coupled to a perimeter edge of said solar dish, said solar collector panel being operationally coupled to said electronic control assembly for providing power to said electronic control assembly.

7. The solar powered fluid heating system of claim 1, further comprising:
   said solar dish including a plurality of generally triangular fiberglass panels, each panel having a plurality of mirrors coupled to a face of said panel; and
   said solar dish including a central plate member, said central plate member having at least one drainage hole for permitting fluid to drain from said solar dish, said central plate further having a plurality of bolt holes for facilitating coupling of said panels to said central plate for forming said solar dish.

8. The solar powered fluid heating system of claim 7, further comprising:
   each of said mirrors being generally hexagonal in shape.

9. A solar powered fluid heating system comprising:
   a solar dish having a mirrored concave surface;
   a power head assembly coupled to said solar dish by a support pole extending outwardly from said solar dish;
   a fluid line extending through a lumen of said support pole, an outer wall of said support pole inhibiting damage to said fluid line extending through said support pole, said fluid line being coiled at a focal point of said mirrored surface of said solar dish whereby solar rays are directed by said solar dish onto said coiled fluid line for heating fluid passing through said coiled fluid line;
   a base support member for supporting said solar dish;
   a dish adjustment assembly coupled between said solar dish and said base support member for adjustably coupling said solar dish to said base support member whereby said solar dish is adapted for positioning to face the sun;

wherein said dish adjustment assembly includes
a mounting bracket mounted to said solar dish;
a connection member mounted to said solar dish and offset from said mounting bracket;
a generally U-shaped adjustment bracket pivotally mounted to said mounting bracket;
a first adjustment motor having an extendable adjustment arm, said first adjustment motor being coupled between said connection member and a distal end of said adjustment bracket such that extension of said adjustment arm pivots said solar dish relative to said adjustment bracket;
a medial portion of a cross-member of said adjustment bracket being pivotally coupled to a base connection member extending from said base support member;
a second adjustment motor having an extendable adjustment arm, said second adjustment motor being coupled between said base support member and an end of said cross-member of said adjustment bracket such that extension of said adjustment arm of said second adjustment motor pivots said solar dish relative to said base connection member;
said power head assembly being positioned proximate a focal point of said mirrored concave surface for maximizing efficiency of said fluid heating system;
an electronic control assembly operationally coupled to said first adjustment motor and said second adjustment motor for facilitating positioning of said solar dish;
said power head assembly including a heat sensor, said heat sensor being operationally coupled to said electronic control assembly;
a light sensor coupled to said solar dish and operationally coupled to said electronic control assembly for facilitating automatic positioning of said solar dish such that said electronic control assembly selectively activates said first and second adjustment motors whereby the solar dish is adapted to face the sun as the sun moves relative to the position of the solar dish to maximize the efficiency of the fluid heating system;
a solar collector panel coupled to a perimeter edge of said solar dish, said solar collector panel being operationally coupled to said electronic control assembly for providing power to said electronic control assembly;
said power head assembly including a dish member, said dish member having a reflective concave surface facing said mirrored concave surface of said solar dish for directing solar rays to said coiled fluid line for heating fluid passing through said coiled fluid line;
said solar dish including a plurality of generally triangular fiberglass panels, each panel having a plurality of generally hexagonal mirrors coupled to a face of said panel; and
said central plate member having at least one drainage hole for permitting fluid to drain from said solar dish, said central plate further having a plurality of bolt holes for facilitating coupling of said panels to said central plate for forming said solar dish.

* * * * *